Nov. 30, 1971   J. HENSHAW ET AL   3,623,203
REINFORCED STRUCTURAL MEMBERS AND METHOD OF MAKING SAME
Filed March 24, 1970   2 Sheets-Sheet 2
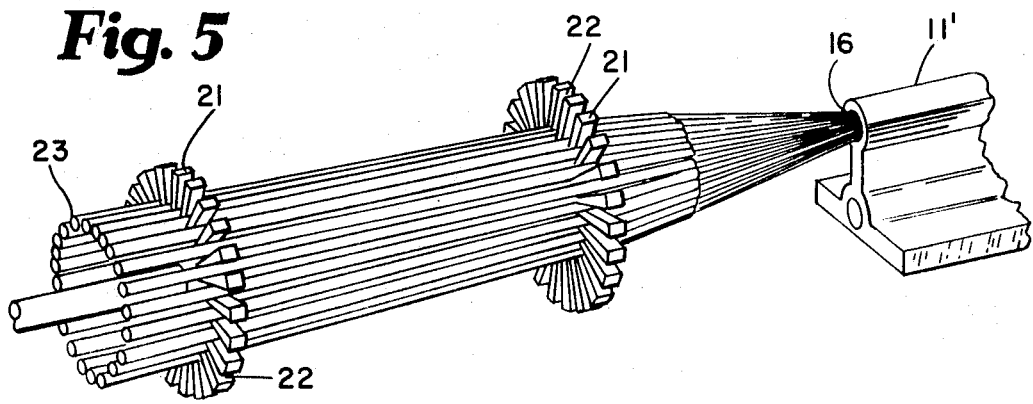
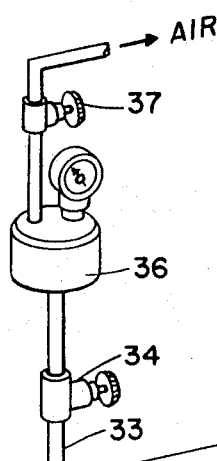
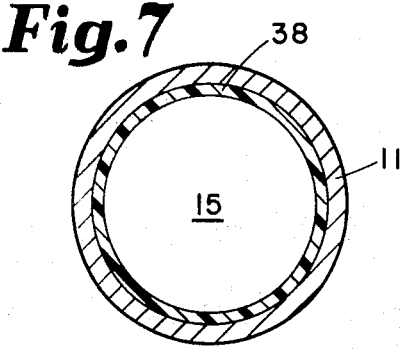
INVENTOR.
JAMES HENSHAW
PAUL J. ROY
BY 3,623,203
REINFORCED STRUCTURAL MEMBERS AND METHOD OF MAKING SAME
Jim Henshaw, Harvard, and Paul J. Roy, Lowell, Mass., assignors to Avco Corporation, Cincinnati, Ohio
Filed Mar. 24, 1970, Ser. No. 22,199
Int. Cl. B23p *17/00*
U.S. Cl. 29—155 R                                    11 Claims

ABSTRACT OF THE DISCLOSURE

This invention covers a structural member having a high strength to weight ratio. The invention relates to methods of processing high strength-high modulus (of elasticity) composite material used in conjunction with metal carriers and result in integrated metal-composite structural elements. More specifically, the high strength-high modulus composite is deposited within passages or hollows within the metal carriers.

---

With the introduction of high strength-high modulus composite material in the aircraft and aerospace industry, the weight savings projected from the use of glass, boron or graphite filamentary reinforcement in a plastic resin matrix, has stimulated many new design concepts and process techniques where advanced composite materials can be combined with metals and result in equivalent performance to that provided by all metal structural elements. These metal-composite structures are usually designed such that the composite reinforcing material is sheathed with and stablized by a metal carrier which serves as the primary member fon attachment to a base structure and for transmitting loads during use.

Structural elements typical of stiffeners, beam caps, longerons, etc., currently employed in existing aircraft designs can be fabricated into metal carriers out of structural grade aluminum, magnesium, steel or titanium. Processing the metal carrier into the appropriate form consists of performing channeled or hollowed passages to contain the composite material. This can be accomplished by continuous extrusion, or integral forming of sub-units by sheet rolling, riveting, welding, adhesive bonding or any combination of these processes. The metal carriers, which are all linearly oriented and contain uniform channeled or hollowed cross sections can then be filled with either unidirectional filaments or precured composite material and secured to form the final integrated metal-composite structure.

Current methods for processing metal-composite structural elements involves placing precured composite material into the preformed channeled passages of a metal carrier (the channels of which have been pretreated with uncured adhesive bond material) and subsequently securing the filled channels to enclose the composite for immediate cure of the bond material.

Clearly it is not possible to form a reliable bond by fitting a precured composite into a passage open only at the ends.

This disadvantages of the current method, in particular the manner of inserting composite material and subsequent assembly processing, are:

(1) Costly tooling is required to fabricate continuous length precured composite material and it becomes impractical to tool up for producing lengths in the range of twenty (20) feet such as that required for large aircraft or aerospace structures.

(2) Costly adhesive bond fixturing and final assembly metal forming tools are required to enclose the composite filled channels.

(3) Subsequent assembly of metal carriers resulting from joining sub-uits by welding, riveting, sheet rooling or adhesive bonding in the areas of the filled channeled passage do no provide as reliable (a) design, (b) environmental protection, and (c) transfer of load as with the filling of preformed hollowed passages.

(4) The method is limited to processing metal carriers with preformed channels only and therefore cannot be used for processing carriers with hollows.

(5) It is not as practical to fabricate partially or fully curved and complex shaped metal-composite structures.

THE OBJECTS

It is an object of the invention to provide an integrated metal composite structure having a 40 to 60 percent weight saving over equivalent all metal structures.

It is another object of the invention to provide an integrated metal-composite structure providing low modulus material at the interface between the composite and a metal for reducing stress concentration points.

It is another object of the invention to provide an integrated metal-composite structure in the form of a quasi-homogeneous metal-composite structure.

Other objects of the invention are to provide methods for making quasi-homogeneous and integrated metal-composite structures which are:

(1) capable of fabricating curved or complex shaped structures, (2) essentially not restricted in length, (3) to eliminate costly molding, bonding, and metal forming tooling, (4) processed to result in totally enclosed composite material without discontinuities, and (5) capable of producing a composite having nearly uniform filament distribution.

In accordance with the invention, a method of making an integrated metal-composite structure comprises the steps of constructing a metal structure with a passage defined therein, threading a plurality of high strength-high modulus filament into said passage so that the filaments ocupy from 40 to 70 percent of the cross section of the passage by volume. The passage is then evacuated and filled with a curable resin which is cured in situ.

Also, in accordance with the invention, an integrated metal-composite structure comprises a metal structure with a passage defined therein. The walls of the passages may be coated with a low modulus material. The coated passage is then filled with a composite material containing a plurality of high modulus filament so that the quantity of filaments occupy from 40 to 70 percent of the cross section of the passage by volume.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 5 shows a method of threading a plurality of bundles of filaments into a metal structure, where each of the bundles contains a plurality of collimated filaments;

FIG. 6 is a schematic representation of the infiltration and curing apparatus; and FIG. 7 is a section of an integrated metal-composite cylinder showing a low modulus coating at the interface of the metal and composite.

Figure 1:
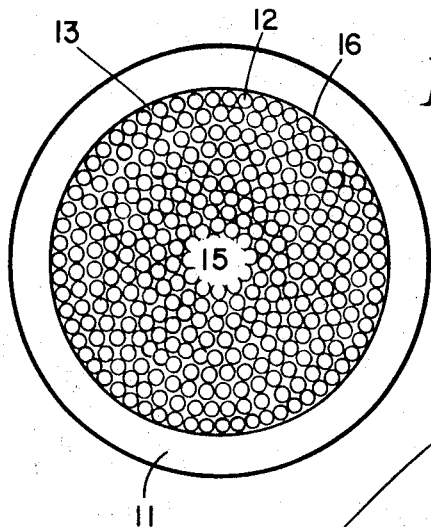
FIG. 1 shows an enlarged representation of a section of an integrated metal-composite chamber and particularly the distribution of filaments within the metal.
Figure 2:
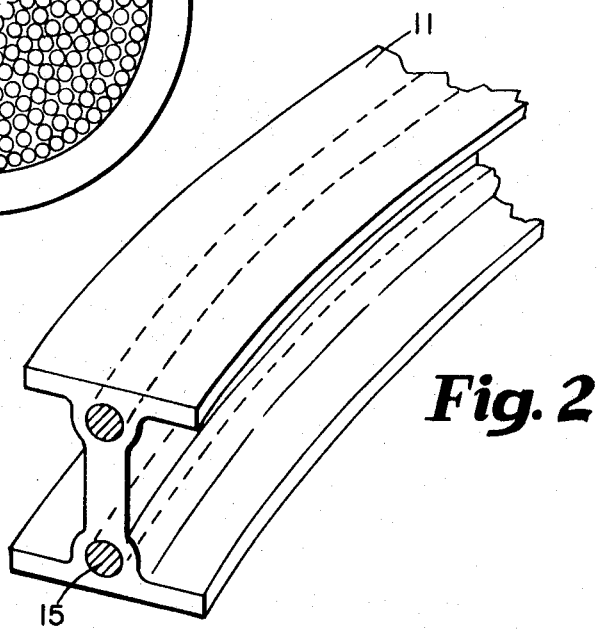
FIG. 2 is a pictorial representation of a curved and extruded integrated metal-composite structure.
Figure 3:
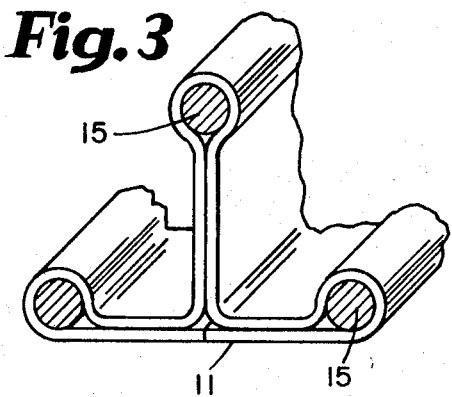
FIG. 3 is a section of a rolled form of integrated metal-composite structure.

FIG. 1 depicts a section of an integrated metal-composite structure 10 formed from a metal sleeve 11 containing a composite 15 have a plurality of high strength-high modulus filaments 12 uniformly distributed throughout the composite 15 and the sleeve passage 16. The filaments 12 are bonded to the sleeve by means of a polymeric matrix 13.

Preferably the filaments occupy from 40 to 70 percent of the cross section of the passage, by volume. The preferred design parameter, however, is 50 to 60 percent.

Where 4 millimeter diameter filament is used, as is customary with boron filament, roughly 1200 filaments occupy a 3/16 inch diameter passage. However 6 or 8 mil diameter filaments may also be used.

To thread the filaments into a passage efficiently, filaments are first collimated into bundles containing about 50 filaments each. Referring to FIG. 5 of the drawing, there is shown one means for collimating filaments. The collimating means comprises spaced discs 21 which have developed therein radial slots 22. The radial slots 22 are axially alligned as indicated. Individual filaments are deposited in complimentary slots 22 and make up a bundle 23 of filaments. As shown a plurality of bundles 23 are threaded into a passage 16 in the metal structure 11.

The metal structure 11 with the filaments contained in the passage is positioned within an impregnating and curing apparatus 24 as seen in FIG. 6. The impregnating curing apparatus 24 includes heating elements 26 coupled to an electrical power supply 27. The apparatus also includes a vacuum pump (not shown) coupled to a pot 29 which in turn is coupled by means of a conduit 31 to one end of the metal structure 11 where it is positioned in a passage, as shown at 32 in FIG. 6. The other end of the passage is coupled by a conduit 33 through a valve 34 to a resin pot 36. The resin pot 36 is coupled through a reducing valve 37 to a source of air under positive pressure (not shown).

Alternately, the bundles of filaments shown in FIG. 6 are first coated with a liquid uncured resin then threaded into a metal structure passage. Under most conditions it will not be necessary to evacuate and impregnate the passage before the resin coated filaments are cured. On the other hand, as a safety factor, the passage may be subjected to a light vacuum before additional resin is passed through the passage under positive pressure to insure a complete wetting of the filament in the passage.

Precoating the filaments with the curable resin before they are threaded into a passage produces a much more uniform distribution of filaments in the passage and guarantees no contact of bare filaments. So noticeable is the improvement in filament distribution over threading the filaments dry that precoating is the preferred practice.

The precoating is typically the same resin as the impregnant except that the quantity of hardner is adjusted to allow the precoating to become semi-cured and semi-hard at the temperature at which the filaments are threaded into the passage. The semi-cured precoating stays on the filaments.

Typically, when the precoating and impregnant are raised to curing temperature, the precoating softens and co-mingles with the imupregnant to form an integrated bond.

FILAMENTS

For maximum weight saving in regular and continuous elements, such as panel stiffeners, longerons, beam caps, frame caps, etc., high strength-high modulus filaments are used. Typically glass filaments having a modulus of 15 million p.s.i. or greater, or boron filaments having a modulus of about 60 million p.s.i., are preferred. Graphite filaments typically having a modulus of 60 million p.s.i. or greater, are also a prime candidate. Most of the experimental work that was performed was performed on a boron-epoxy resin system.

MATRIX RESINS

Epoxy resin systems and polyester resin systems are preferred since these do not produce volatiles when cured. Whereas phenolics and polyimides do not necessarily have less strength than epoxies and polyesters, the latter two do generate volatiles when cured and create some voids within the integrated metal-composite structure. It follows that volume of voids increase and strength of the matrix bond descreases. But as high temperature performance can be achieved with phenolics and polyimides, their use will not be disregarded.

The desirable characteristic sought for the resin systems were low viscosity, minimum shrinkage, long pot life, low temperature cure and high strength and high modulus. Several of the epoxies and polyester systems were eliminated mainly because of limitations in viscosity and pot life. Candidate resins for use in integrated metal-composite structures are: Glycidyl type epoxy resins such as diglycidyl ether of Bisphenol A, glycidyl ethers of novolac resins, aliphatic polyols and of other aromatic compounds. And, in addition, epoy resins synthesized from olefins, chloroacetals and epoxidation performed by peracetic acids can be utilized.

Curing agents, hardeners and/or catalysts for these types of epoxy resins include aliphatic and aromatic based tertiary, secondary or primary amines, and anhydrides such as diethylene triamine, meta-phenylenediamine or eutectics of these, boron-trifluoride mono-ethylamine and maleic anhydride.

Any combinations of these resins and curing agents or modified versions of these systems to include additions of reactive diluents, such as phenyl glycidyl ether, can be utilized to result in a final viscosity of no greater than 1000 centipoises.

METALS

There are primarily two areas of concern for metal compatibility with the matrix system; (1) the stresses that result from the differences in the modulus of the boron epoxy and the metal, and (2) the residual stresses resulting from differential thermal expansion of the individual materials during resin cure and service environment.

With regard to the former, the composite does not place any restrictions on the metal material intention as accepted design yields of the metal is normally in excess of the strain associated with 2/3 of the ultimate stress of the composite. While this is not so in compression, in most designs for compression on the structures mentioned either local or column filler is critical, thus possibly allowing the use of most soft alloys particularly aluminum alloys.

Should thermal expansion between the metal and the composite occur at an elevated curing temperature, internal thermal stresses are generated when the integrated metal-composite structure is cooled. These internal stresses are only partly relieved if the normal operating temperature of the integrated metal-composite structure operates above room temperature. No relief in internal stresses occurs if the operating temperature of the integrated metal composite structure is room temperature. To completely eliminate these thermal stresses at room temperature, it is preferred that the resin undergoes an initial cure at or near room temperature so as to mechanically bond the composite to the metal. The resin is then put through a post-curing cycle at a higher temperature which induces negative strains that are relieved when the integrated metal-composite structure is cooled.

The introduction of a lower modulus/high strain resin adhesive forming the composite-metal interface, see 38 in FIG. 7, will reduce the residual stresses and, hence, produce superior bonding. The resin adhesive 38 will also act to reduce the peak sheer stress which is prominent at the ends of the elements between the composite-metal interface.

Low modulus resins have a modulus of 100,000 to 300,000 p.s.i. In contrast, the matrix resin has a modulus 400,000 to 800,000 p.s.i. The low modulus material cures as a softer material and can adjust more readily to temperature changes than the matrix material.

METAL FABRICATION

Figure 4:
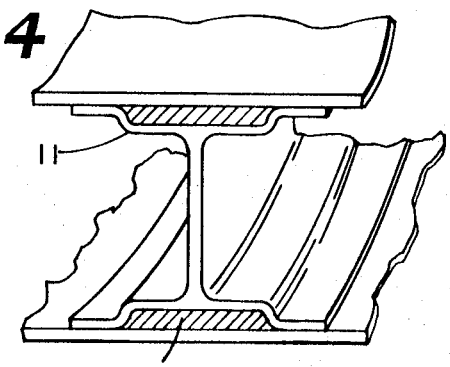
FIG. 4 is a section of a welded, riveted, adhesive bonded integrated metal-composite structure.

The structural elements previously discussed stiffeners, beam caps, longerons, etc., which are all linearly oriented can be made by convention extrusion, sheet metal roll forming or the assembly of component parts by means of welding, riveting, or adhesive, such as shown in FIG. 4.

Tests were only conducted on twelve-foot sections, but because the filaments are threaded into the passage and cured in situ, the process lends itself to the manufacture of longer lengths particularly where the metal structure is formed from an assembly of parts.

The more specific advantages of these process techniques over current methods used are abstracted as follows; where feasibility, efficiency, cost and reliability are the determining factors.

(1) The only practical methods for fabricating curved or complex shaped integral metal-composite structures.

(2) There are essentially no length restrictions as compared to current methods used because of the nature of processing.

(3) Metal-composite structures can be produced on a production basis.

(4) The processes eliminate the need for costly molding, bonding, and metal forming tooling.

(5) In particular, these process techniques are the only methods by which extruded metal carriers containing hollows can be processed to result in totally enclosed composite material without discontinuities.

(6) Use of extruded metal carriers which contain hollows provides a continuous sheathing (i.e., with no riveted, rolled, welded, or bond discontinuities) of metal over the composite which:

(a) gives better protection for environmental exposure,
(b) permits a greater degree of reliability in design than with riveted, welded, rolled or bonded assemblies, and finally,
(c) assures better transfer or load throughout the structure for improved, reliability.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A method of making an integrated metal-composite structure comprising the steps of constructing a metal structural member with a passage defined therein, threading a plurality of high modulus filaments into said passage so that said filaments occupy 4 to 70 percent of the cross section passage by volume, evacuating said passage, filling said evacuated passage with a curable resin, and curing the resin, in situ.

2. A method as described in claim 1 in which said plurality of high modulus filaments are threaded into the passage by threading a plurality of bundles each containing a plurality of collimated filaments.

3. A method as described in claim 1 in which said structural member is constructed by extruding or rollforming, adhesive bonding, riveting, welding an assembly of parts.

4. A method as described in claim 1 in which said resin is first cured at a low proposed operating temperature to form a mechanical bond between the resin and the structural member and then are post-cured at a higher temperature.

5. A method as described in claim 1 in which the filaments are first coated with the curable resin before threading into said passage to effect a more uniform distribution of filaments.

6. A method as described in claim 1 in which said resins are from a class consisting of resins which do not generate volatiles when cured.

7. A method as described in claim 1 in which said resins are from a class consisting of resins which do generate volatiles when cured.

8. A method as described in claim 1 where the walls forming said passages are first coated with a material having a lower modulus than the resin making up the composite.

9. A method as described in claim 1 wherein the viscosity of the curable resin is 1000 centipoises or lower.

10. A method as described in claim 8 wherein the lower modulus resin has a modulus of 100,000 to 300,000 p.s.i. and the curable resin has a modulus of 400,000 to 800,000.

11. A method of making an integrated metal-composite structure comprising the steps of constructing a structural member with a passage defined therein, coating a plurality of high modulus filaments with a curable resin, precuring said coating so that it will adhere to the filaments, threading said coated filaments into said passage so that said filaments occupy 40 to 70 percent of the passage by volume and curing said resin.

References Cited
UNITED STATES PATENTS

| | | | |
|---|---|---|---|
| 2,887,762 | 5/1959 | Dobell | 29—155 R |
| 3,487,518 | 1/1970 | Hopfeld | 29—155 R |

THOMAS H. EAGER, Primary Examiner

PO-1050
(5/69)

UNITED STATES PATENT OFFICE
CERTIFICATE OF CORRECTION

Patent No. 3,623,203      Dated November 13, 1971

Inventor(s) Jim Henshaw and Paul J. Roy

It is certified that error appears in the above-identified patent and that said Letters Patent are hereby corrected as shown below:

Col. 1, line 34, for "fon", read---for---; Col. 2, line 2, for "sub-uits", read---sub-units---; Col. 2, line 2, for "rooling", read---rolling---; Col. 3, line 65, for "imupregnant", read ---impregnant---; and Col. 6, line 6, for "4", read---40---.

Signed and sealed this 5th day of September 1972.

(SEAL)
Attest:

EDWARD M.FLETCHER,JR.            ROBERT GOTTSCHALK
Attesting Officer                  Commissioner of Patents